US008253624B2

(12) United States Patent
King et al.

(10) Patent No.: US 8,253,624 B2
(45) Date of Patent: Aug. 28, 2012

(54) DETECTION AND REDUCTION OF PERIODIC JAMMING SIGNALS IN GPS RECEIVERS AND METHODS THEREFOR

(75) Inventors: Thomas M. King, Tempe, AZ (US); Thomas Ricks, Tempe, AZ (US); David Murray, Fanwood, NJ (US)

(73) Assignee: Motorola Mobility LLC, Libertyville, IL (US)

( * ) Notice: Subject to any disclaimer, the term of this patent is extended or adjusted under 35 U.S.C. 154(b) by 1536 days.

(21) Appl. No.: 10/452,753

(22) Filed: Jun. 2, 2003

(65) Prior Publication Data

US 2004/0239559 A1    Dec. 2, 2004

(51) Int. Cl.
  *G01S 19/21* (2010.01)
  *G01S 19/37* (2010.01)
(52) U.S. Cl. .............................. 342/357.59; 342/357.77
(58) Field of Classification Search ............. 342/357.02, 342/357.1, 19, 357.59, 357.77; 375/148
See application file for complete search history.

(56) References Cited

U.S. PATENT DOCUMENTS

| | | | | |
|---|---|---|---|---|
| 3,140,446 A | * | 7/1964 | Myers et al. ................... | 455/224 |
| 3,218,556 A | * | 11/1965 | Chisholm ........................ | 342/94 |
| 3,887,919 A | * | 6/1975 | Christensen et al. ........... | 342/19 |
| 3,953,802 A | * | 4/1976 | Morris et al. .................. | 375/349 |
| 4,114,105 A | * | 9/1978 | Duncan ........................... | 455/223 |
| 5,212,827 A | | 5/1993 | Meszko et al. | |
| 5,301,368 A | * | 4/1994 | Hirata .............................. | 455/78 |
| 5,822,429 A | | 10/1998 | Casabona et al. | |
| 5,889,821 A | | 3/1999 | Arnstein | |
| 5,955,987 A | * | 9/1999 | Murphy et al. .......... | 342/357.06 |
| 5,982,324 A | | 11/1999 | Watters et al. | |
| 5,999,124 A | | 12/1999 | Sheynblat | |
| 6,107,960 A | | 8/2000 | Krasner | |
| 6,442,375 B1 | | 8/2002 | Parmentier | |
| 6,448,925 B1 | * | 9/2002 | Shridhara ................ | 342/357.02 |
| 6,466,163 B2 | * | 10/2002 | Naruse et al. ............... | 342/357.1 |
| 6,529,493 B1 | | 3/2003 | Varin | |
| 6,681,181 B2 | * | 1/2004 | Fielder .......................... | 701/213 |
| 6,791,491 B2 | * | 9/2004 | Talvitie .................... | 342/357.02 |
| 6,961,019 B1 | * | 11/2005 | McConnell et al. ....... | 342/357.1 |
| 2002/0107033 A1 | | 8/2002 | Kim | |

FOREIGN PATENT DOCUMENTS

| | | |
|---|---|---|
| EP | 0792017 A2 | 8/1997 |
| EP | 1122554 A1 | 8/2001 |
| GB | 2113047 A * | 7/1983 |
| JP | 2000249754 A * | 9/2000 |
| WO | WO 01/77705 A2 * | 10/2001 |

OTHER PUBLICATIONS

IEEE Plans 1978 Position Location and Navigation Symposium, Nov. 6-9, 1978, 16 pages.

* cited by examiner

*Primary Examiner* — Gregory C Issing
(74) *Attorney, Agent, or Firm* — Roland K. Bowler, III; Stephen H. Shaw (57) ABSTRACT

A method for eliminating or reducing interference in a receiver, for example, interference in a satellite positioning system receiver caused by a co-located TDMA transmitter, including detecting (210) the presence of a jamming signal, generating a synchronous blanking signal (220), and reducing the jamming signal by blanking (230) the receiver with a blanking signal. In one embodiment, the jamming signal is detected in the receiver, for example, at a correlator output of a satellite positioning system receiver.

13 Claims, 10 Drawing Sheets

DETECTION AND REDUCTION OF PERIODIC JAMMING SIGNALS IN GPS RECEIVERS AND METHODS THEREFOR

FIELD OF THE DISCLOSURE

The present disclosure relates generally to wireless communications, and more particularly to satellite positioning system enabled wireless communications devices, for example, cellular telephones having Global Positioning System (GPS) receivers, devices and methods therefor.

BACKGROUND

The Global Positioning System (GPS) is a worldwide navigation system that is based on a constellation of earth-orbiting satellites, which are used as reference points to calculate positions on earth. GPS based positioning computations are based upon "triangulation" wherein a GPS signal receiver determines distances to several satellites based upon the travel time of GPS signals transmitted from the corresponding satellites. In addition to determining distances to satellites, GPS receivers may also obtain information from GPS signals indicative of positions of the satellites in space. GPS receivers may also correct for GPS signal transmission delay through the atmosphere and perform other functions.

The integration of GPS receivers with cellular telephones is being driven initially to comply with the emergency location (E-911) mandate of the Federal Communications Commission in the United States. GPS-based position determination technology will also enable location-based applications and value-added services in cellular telephones and other communications devices.

In GPS enabled cellular telephones, it is common for radio frequency (RF) signals transmitted from cellular transceiver antenna to couple with the GPS antenna. As a result, radio energy from the cellular transceiver interferes with the operation of the GPS receiver. The relatively close proximity of the GPS receiver and antenna to the cellular transceiver and antenna in increasingly small handset form-factors favored by consumers aggravates this interference.

In addition to interfering with the reception and decoding of GPS signals while the cellular transceiver is transmitting, GPS receiver operation may also be disrupted while the cellular transceiver is in idle or receive mode. An automatic gain control (AGC) circuit is typically used to adjust the gain of the signal received by GPS antennas to power levels suitable for processing by the GPS receiver. The coupling of RF energy from the cellular antenna to the GPS antenna, however, generally increases the strength of the signal applied to the input of the GPS receiver. In response, the AGC circuit tends to reduce the gain of the GPS signal applied to the GPS receiver. When the cellular transceiver transitions from transmit to idle or receive mode, the gain applied by the AGC module to the signal at the GPS receiver may then be too low. The AGC module must subsequently increase the applied gain in response to the lower power level, but latency associated with controlling the gain of the GPS signal has an adverse effect on GPS signal processing.

All known prior art schemes to blank GPS signals during operation or transmission of radio transceiver signals are based upon sending a blanking signal to the GPS receiver upon detecting the presence of a jamming signal outside of the GPS receiver, before the jamming signal enters the GPS receiver. U.S. Pat. No. 6,107,960 entitled "Reducing Cross-Interference In A Combined GPS Receiver And Communication System" discloses controlling a GPS receiver based on the power of a radio communications power amplifier. Particularly, U.S. Pat. No. 6,107,960 discloses activating or deactivating the GPS receiver front-end and the processing of GPS signals based upon a power level control signal applied to the radio communications power amplifier. Alternatively, U.S. Pat. No. 6,107,960 discloses halting the processing of GPS signals when the power level control signal is high.

U.S. Pat. No. 6,442,375 entitled "Systems And Methods For Maintaining Operation Of A Receiver Co-Located With A Transmitter And Susceptible To Interference Therefrom By Sensitization Of The Receiver" discloses desensitizing the GPS receiver to the affects of TDMA signal transmissions. During communication transmissions, an automatic gain control (AGC) module maintains, i.e., prevents the reduction of, gain applied to GPS signals in response to an AGC control logic signal or in response to a communication protocol program signal during TDMA transmission intervals. During idle and receiver modes, the AGC module resumes control of the GPS signal gain. This scheme merely eliminates the latency associated with cyclical GPS signal gain control discussed above, but does not prevent interference of the GPS signal. U.S. Pat. No. 6,442,375 also discloses isolating the GPS receiver from the GPS antenna with RF switch control logic or with a communication protocol program during transmission intervals.

U.S. Pat. No. 6,448,925 entitled "Jamming Detection And Blanking For GPS Receivers" discloses turning off a GPS receiver in the presence of a jamming signal, which is detected by increases in the output of chained correlators or by the presence of clock drift in the absence of temperature changes or by sudden changes in the signal to noise ratio (S/N) of the received GPS signal. U.S. Pat. No. 6,448,925 relies upon dead reckoning methods in lieu of GPS position determination in the presence of a jamming signal.

Eric Hoffman disclosed in a publication at the IEEE Position, Location and Navigation Symposium in 1978 entitled "GPSPAC: A Spaceborne GPS Navigation Set" a method of blanking the input of a GPS receiver with an external blanking pulse to permit GPS operation in the presence of high-power on-board radar altimeter emitters.

The various aspects, features and advantages of the disclosure will become more fully apparent to those having ordinary skill in the art upon careful consideration of the following Detailed Description thereof with the accompanying drawings described below.

DETAILED DESCRIPTION

Figure 1:
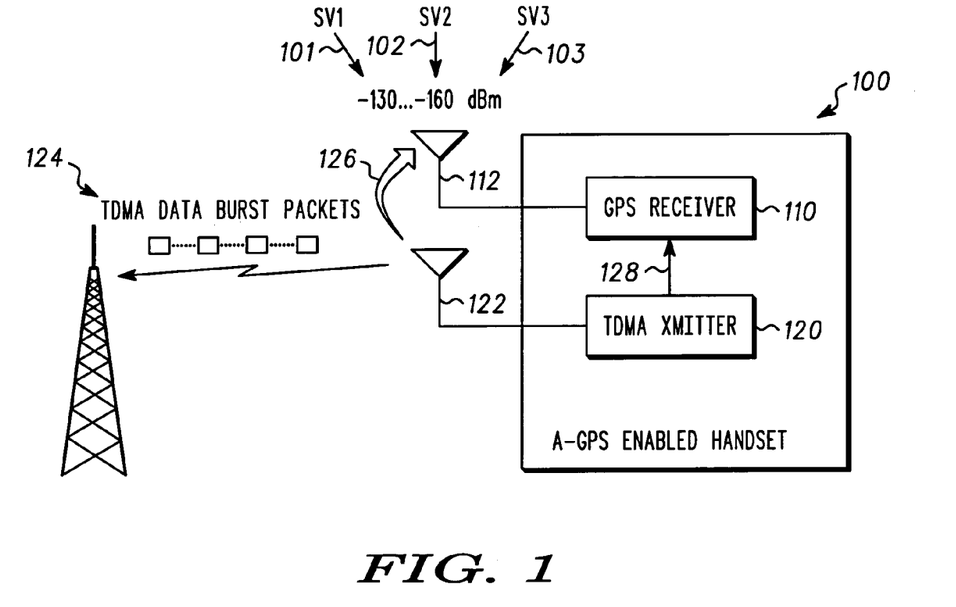
FIG. 1 is an exemplary receiver susceptible to interference from a co-located transmitter.

FIG. 1 illustrates an exemplary mobile wireless communications device 100 including a satellite positioning system (SPS) receiver, for example, a Global Positioning System (GPS) receiver 110 and a Time Division Multiple Access (TDMA) transmitter 120, which is part of a cellular wireless transceiver in the exemplary embodiment. In other embodiments, the SPS receiver and transmitter is part of some other mobile communications device, for example, a laptop computer, a Personal Digital Assistant (PDA), a pager, an Internet/intranet access device, a personal organizer, palmtop receivers, among other communications devices. In other embodiments, the SPS receiver and transmitter is part of a fixed communications device, for example, a fixed base station transmitter.

Generally, the SPS receiver is susceptible to interference from the transmitter during transmission. In FIG. 1, the exemplary TDMA transmitter transmits data packets in a burst pattern 124, which interferes with reception at the GPS receiver. More generally, the receiver susceptible to the interference is a receiver other than the exemplary SPS receiver, and the transmitter that creates the interference is a transmitter other than the exemplary cellular communications transmitter.

Because the mobile wireless communications devices are relatively small, and the trend is toward increasingly smaller devices, there is an increased likelihood of interference between transmitter and receiver. In FIG. 1, for example, the spatial separation between the GPS antenna 112 and the cellular transceiver antenna 122 is minimal, which creates an environment for radio frequency (RF) coupling from the cellular transceiver antenna 122 to the GPS antenna 112. FIG. 1 illustrates antenna coupling at 126. The interference can also arise from inter-circuit coupling between a transmitter circuit and a receiver circuit. FIG. 1 illustrates inter-circuit coupling at 128. Coupling is especially problematic in the embodiments where the circuits are collocated or share portions of their mechanical assembly in order to reduce space usage or reduce cost.

The interference from the transmitter to receiver may be especially acute where the receiver receives relatively weak signals compared to those transmitted by the transmitter. In FIG. 1, the GPS receiver 110 receives satellite signals 101, 102, 103 . . . from corresponding satellites SV1, SV2, SV3 . . . Satellite signals are typically very weak, the strongest of which are at or below −130 dBm. More typically, environmental blockage of satellite signals, for example, by heavy foliage or building obstructions, can reduce the received satellite signal strength even further. Presently, some satellite receivers are expected to receive signals as low as −150 dBM to −160 dBm. Receiving such a weak GPS signal is difficult without the presence of interference, but becomes impossible when a strong out-of-band interfering signal, or jammer, is present. A GSM transmitter in a hand-held cellular telephone can output at much as +23 dBm of signal energy in the target band (800, 900, 1800, or 1900 MHz) when communicating digital voice and data information to a cellular infrastructure.

When a sensitive receiver is placed on the same circuit board as a high-power transmitter, it is very difficult to build in sufficient inter-circuit isolation on the circuit card to prevent the transmitter from jamming the receiver, particularly when the receiver must work simultaneously over a much lower signal range. Thus, even with perfect filtering in the receiver antenna, on-board inter-circuit leakage of the transmitter energy path may adversely affect the input of the receiver.

While the exemplary GPS receiver and transmitter are integrated in a wireless communications handset in FIG. 1, in other embodiments more generally the transmitter and receiver susceptible to the interference may be discrete devices. Thus in other embodiments, the interfering signals may originate from a source that is farther removed in location from the receiver than in the exemplary embodiment of FIG. 1 wherein the GPS receiver 110 and the cellular transmitter 120 are co-located.

In one exemplary embodiment, a TDMA transmitter sends a data burst during a timeslot equal in duration to $15/26$ of 1 millisecond (ms), the "on" time. The "off time" is approximately 4.615 ms. In this exemplary application, there are eight (8) timeslots per TDMA frame and the handset only transmits during one of these frames. Hence, the transmitter is activated only 12.5% of the time as illustrated in FIG. 1 in which individual data packets separated in time are sent to the infrastructure. Accordingly, it is possible to inactivate GPS receiver during the 12.5% of the time that the transmitter is active, leaving 87.5% of the time for GPS receiver to be active. In the exemplary application, the GPS "off" periods are very short, less than one GPS code period (977.5 microseconds) and only about $1/20$ the duration of a GPS data bit. The effective sensitivity loss is a factor of 0.875 or −0.58 dB, which can be overcome by integrating for a time period slightly longer than that required for detecting GPS signals when no jamming signal is present.

Jamming can affect the receiver in several ways. In the exemplary GPS receiver application, the low noise amplifier (LNA) of the receiver may saturate under the influence of the jamming signal. LNA saturation may occur even the presence of in-line filters, such as a ceramic pass-band filter, that selectively allow some signals to pass with little attenuation and that attenuate other signals at different frequencies, for example, frequencies other than the GPS center frequency. In-line filters generally protect the receiver front-end from overloading as long as the undesired signal power produce a signal voltage that is less than the saturation point of the amplifier after attenuation and amplification of the noise. In addition to interfering with the reception and decoding of the received signals while the cellular transceiver is transmitting, receiver operation may also be disrupted while the cellular transceiver is in idle or receive mode as the receiver gain is adjusted after the transition. The foregoing examples, some of which are discussed in the Background of the invention, are not intended to be exhaustive.

Figure 2:
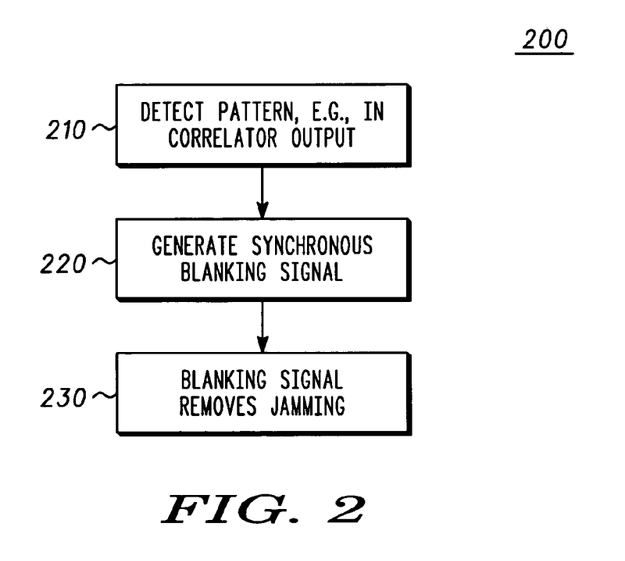
FIG. 2 is a generalized process diagram for eliminating a jamming signal.

In the exemplary process 200 of FIG. 2, interfering signal is detected at block 210. In one embodiment, the jamming signal is detected by observation internally to the receiver affected by the interference or jamming signal, and more particularly by detecting the presence of a jamming signal in the receiver after the jamming signal enters the receiver, rather than by monitoring the source of the jamming signal. In embodiments of the disclosure where the jamming signal is detected within the receiver, no external circuitry is required to detect and blank the receiver, since the receiver self-detects the presence of potentially interfering jammer and self-eliminates the jammer. Thus no additional inputs to the receiver are required, for example, where a GPS receiver is embedded in a cell phone battery pack or in an accessory. Alternatively, in other embodiments, the jamming signal is detected outside the receiver affected by the jamming signal, for example, by detecting the jamming signal at its source.

Figure 3:
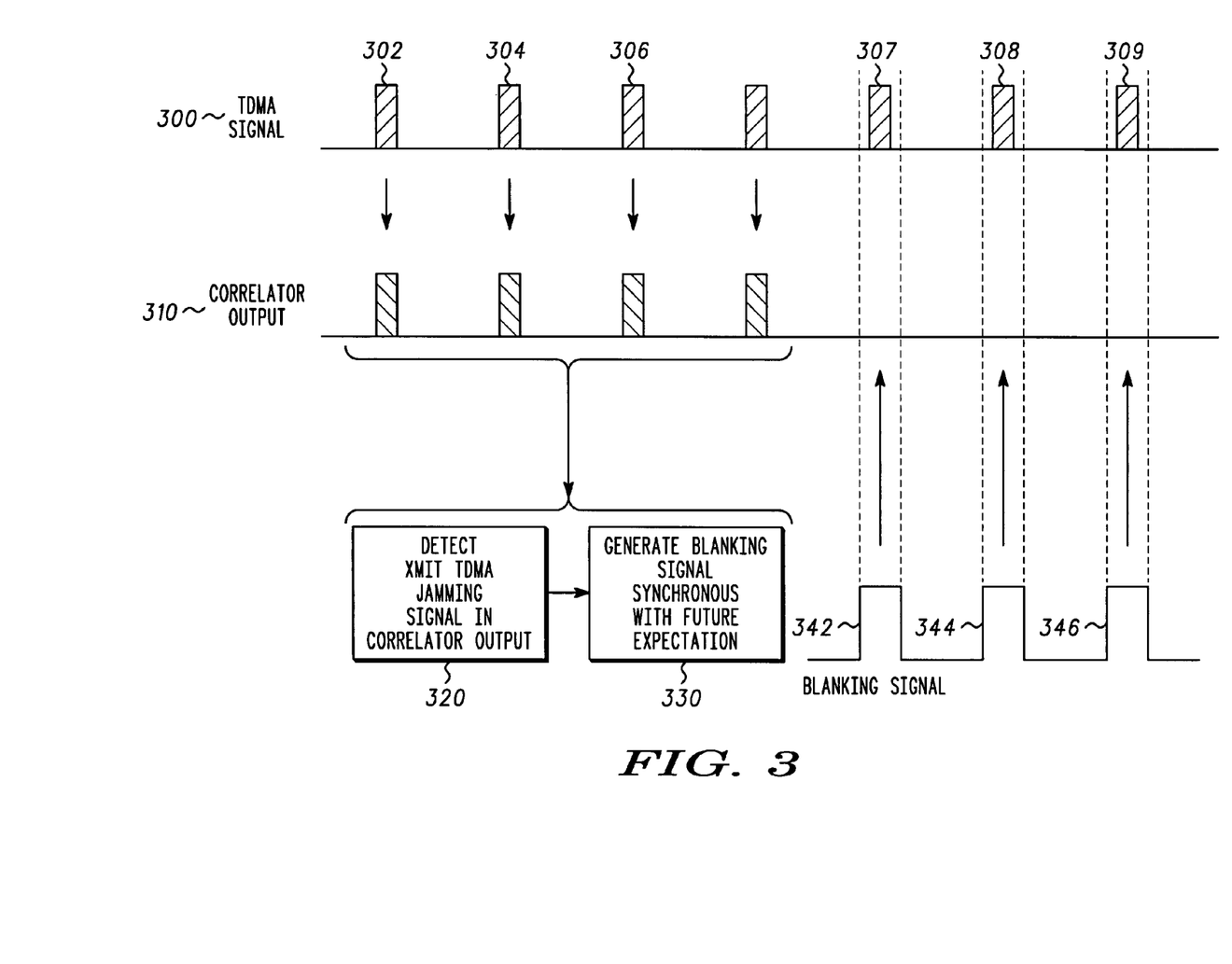
FIG. 3 is a process schematic for detecting and blanking a jamming signal.

In one embodiment, the jamming signal pattern is detected in a correlator output of the GPS receiver, although more generally the jamming signal pattern maybe detected elsewhere in the receiver, which is not necessarily a GPS or SPS receiver. FIG. 3 illustrates an exemplary TDMA signal 300 with data bursts 302, 304, 306 . . . that interfere with a receiver having a correlator. FIG. 3 also illustrates a correlator output having corresponding signal characteristics 312, 314, 316 . . . that correspond in time with the jamming signal bursts.

Generally, the jamming signal is eliminated or at least reduced by blanking the receiver with a blanking signal synchronized with the jamming signal. Many interfering signals are transmitted with repeating or predictable patterns, for example, TDMA over-the-air protocols are known to possess specific pulse repetition intervals (PRI) and pulse width durations (PWD) based on the particular standard with which it complies, for example, GSM transmits data packets having a 477 microsecond pulse duration every 4.615 ms. Thus, a jamming signal having a repeating or predictable pattern, may be blanked with a synchronized blanking signal having similar characteristic. In FIG. 3, a characteristic of the jamming signal at the correlator output, for example, its PRI and/or PWD, is detected at block 320.

In FIG. 2, at block 220, a blanking signal is generated, having a substantially similar characteristic as the detected jamming signal, based on the pattern of the jamming signal. The blanking signal is also synchronized with the jamming signal. In FIG. 2, at block 230, the blanking signal is used to remove or eliminate the jamming signal in the receiver. In FIG. 3, at block 330, a synchronous blanking signal is generated having substantially the same characteristic as the jamming signal. The exemplary blanking signal pulses 342, 344, 346 . . . have a slightly wider pulse wide duration that the corresponding jamming signal pulses 307, 308, 309 . . . , which ensure complete blanking of the jamming signals. In some embodiments the amplitude of the blanking signal pulses may also be greater than that of the jamming signal pulses.

In some embodiments, the automatic gain control (AGC) of the receiver is maintained during blanking, rather than attempting to compensate the AGC, thus avoiding known problems in the art. In the exemplary GPS receiver blanking applications, the one or more correlators of the GPS receiver are frozen or suspended during blanking, or the correlator outputs are zeroed during blanking, or alternatively the correlator outputs may be ignored during blanking.

Figure 4:
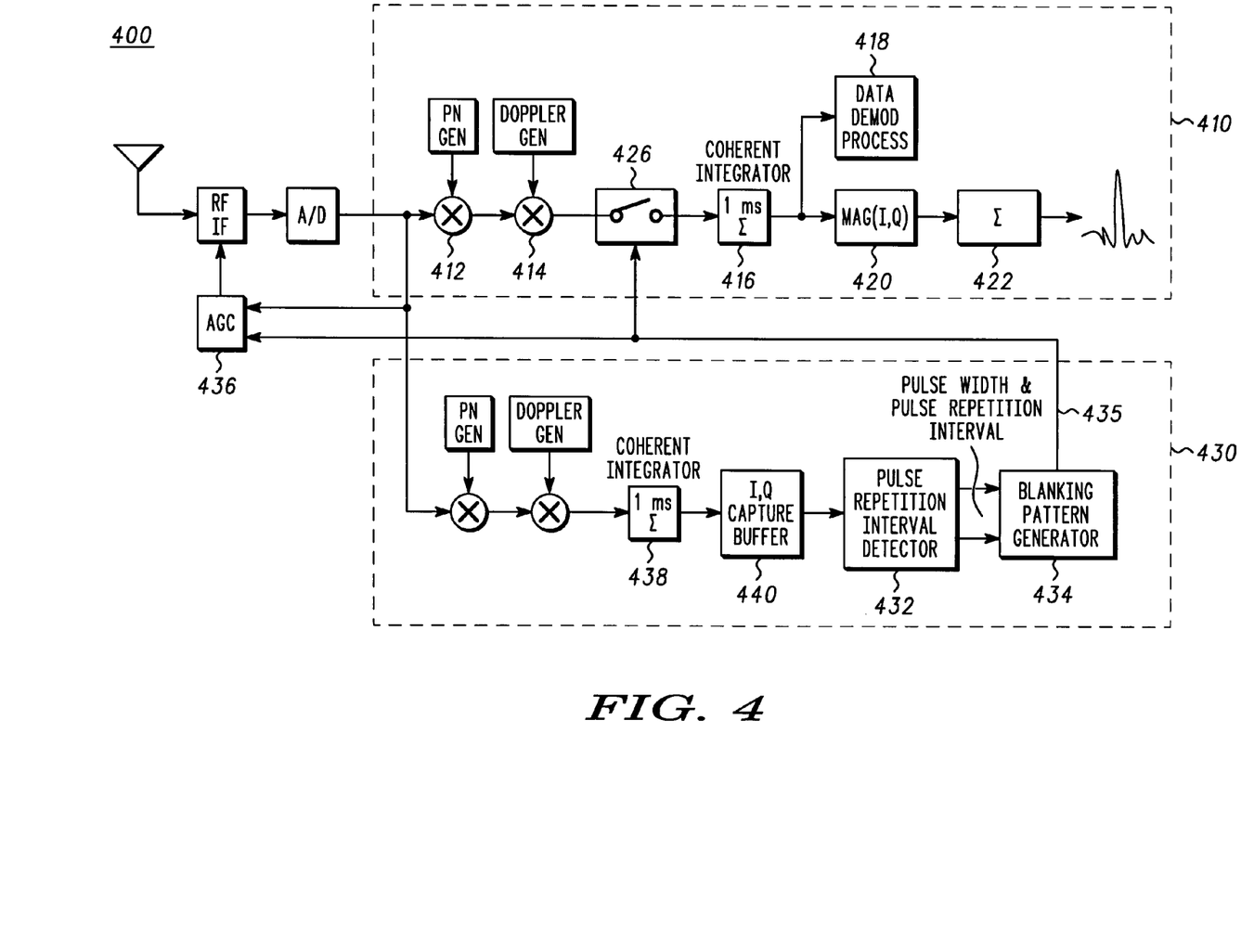
FIG. 4 is a schematic block diagram of an exemplary GPS receiver.

FIG. 4 is a block diagram of an exemplary GPS receiver 400 capable of self-detection and elimination of periodic jamming signals from a nearby transmitter. The receiver has one or more upper channels 410 for traditional signal processing on received signals including dispreading 412, Doppler wipe-off 414, coherent integration 416 for between 1-20 ms, data demodulation 418, I & Q detection 420, and in some embodiments further filtering such as non-coherent integration 422 in which the final output 424 is used to measure one or more pseudoranges. The GPS receiver of FIG. 4 is only exemplary, and is not intended to limit the invention. In other embodiments, the receiver may have other forms, for example, it may be a different type of receiver or it may be a GPS or SPS receiver having a different architecture.

In FIG. 4, in one embodiment, a switch 426 is located in the data path somewhere between the A/D converter 428 and the coherent integrator 416 to enable eliminating the summation data from the integrator 416 leaving the A/D converter that coincides in time to an active local TDMA transmitter, which produces the exemplary jamming signal. In the exemplary embodiment, the switch 426 is located between the Doppler wipe-off 414 and the integrator 416, but in other embodiments the switch could be located elsewhere. In one embodiment, one or more signal data paths are modified as illustrated in the lower signal path 430. The lower signal path contains all the elements of the upper data path, but adds a pulse-repetition interval detector 432 and a blanking pulse generator 434.

In FIG. 4, the output 435 of the blanking pulse generator 434 is used to control the switch 426 between an open and closed state. The switch also controls the automatic gain control (AGC) 436. The AGC interprets the blanking pattern generator output signal 435 so that the AGC state is held constant (held) during active blanking periods. The AGC is allowed to adapt normally however when the blanking pattern generator output signal 435 is inactive.

In one embodiment, the lower path 430 detects the presence of the jammer energy by observation of the output of the coherent correlator 438 at some periodic interval, for example, at 1 ms intervals. If the nearby transmitter is a GSM transmitter, then the TDMA pulses occur for a 477-microsecond pulse duration every 4.615 ms. The PRI and PWD of the jammer signal is generally asynchronous relative to the 1 ms period for processing the GPS signal, and thus the blanking pulse 435 must be synchronized with the TDMA jammer signal.

GPS receivers typically use internal timing signals for processing received GPS signals, which are periodic. For example, the spread spectrum portion of the signal repeats on 1 ms intervals, thus it is required that a coherent integrator sum for at least 1 ms for proper signal detection. The navigation data bit content on the satellite transmitted message sequence is transmitted at a 50 bit per second rate, thus it is also desirable to have internal timing generators within the GPS receiver for processing 20 ms periods of time corresponding to each data bit. A period of time associated with a particular number of integer data bits is typically used to generate internal timing signals, such as 100 ms and 1 second periodic timing events synchronized to the GPS reception process. Thus, there are internal timing signals within a GPS receiver that occur at 1 ms, 20 ms, 100 ms, and 1 second rates that could exist as physical hardware (interrupt) signals or be based on accumulating a certain number of the faster rate signals in a software process. It is these internal timing signals that are used to measure the timing of the TDMA energy pulses relative to the internal GPS timing signals so that blanking pulse generator can be set to the proper timing to eliminate the TDMA signal from the main-stream signal path. Other receivers may have other timing signals that may be used for this purpose. Otherwise it may be necessary to generate timing signals.

In the exemplary embodiment, the jamming signal energy, which is out-of-band jamming in the exemplary application, causes an increase in the noise floor, which is measurable at the output of the coherent GPS integrate and dump filter. In one embodiment, the PN code generator is turned off to improve the noise measurement.

Figure 5:
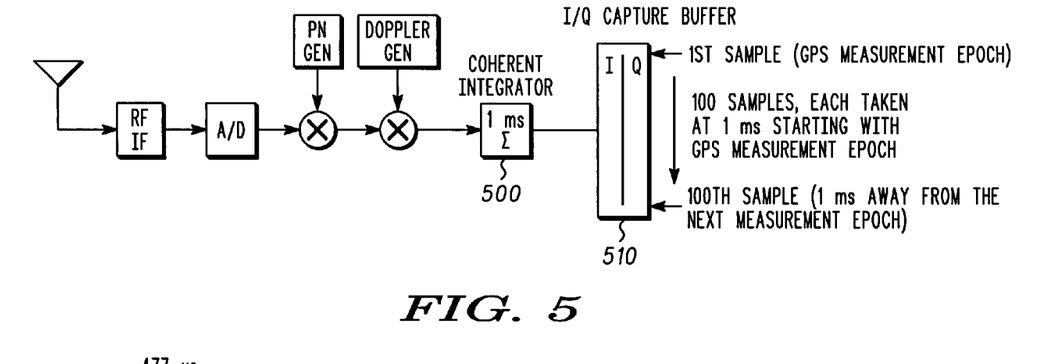
FIG. 5 illustrates the buffering I/Q signal samples at the output of a GPS correlator.
Figure 6:
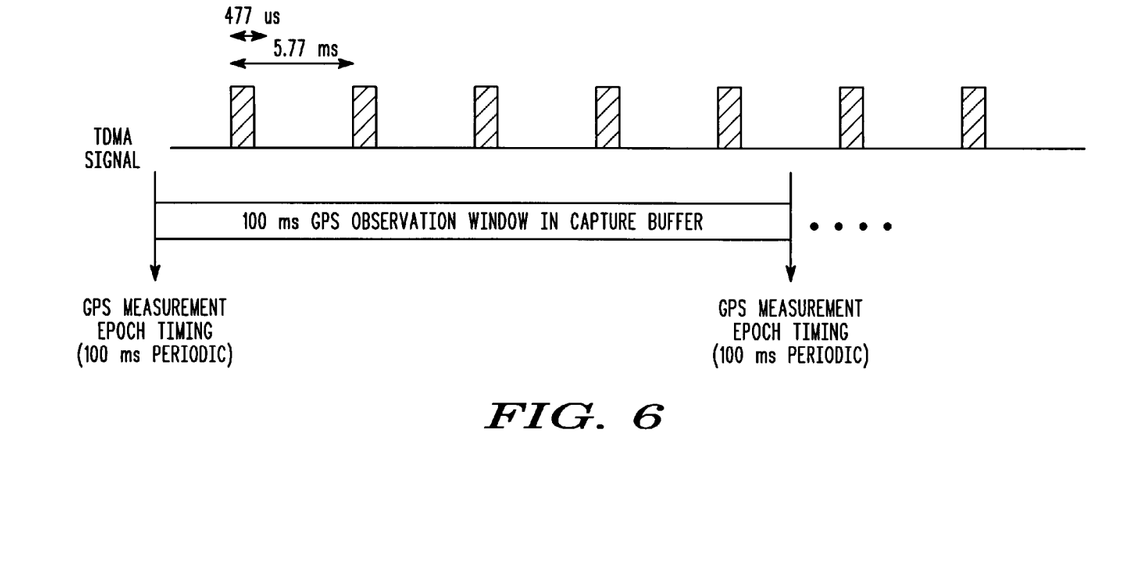
FIG. 6 illustrates TDMA signals relative to an observation window of a receiver capture buffer.

FIG. 5 illustrates the collection of I/Q signal samples at the output of the GPS coherent integrator 500 in a buffer 510. In FIG. 6, the I/Q signal samples are collected at a 1 ms rate, for a period of 100 ms (or the period of the GPS measurement epoch period). The $1^{st}$ sample captured is synchronous with a periodic GPS measurement epoch or with an internal GPS timing signal, such as a 100 ms interrupt or other GPS measurement epoch event. All timing measurements internal to GPS are accomplished relative to the measurement epoch point. In other embodiments, other time periods may be used alternatively. The I & Q samples in the buffer contain a timing record of the output of the 1 ms coherent integrator 500.

Figure 7:
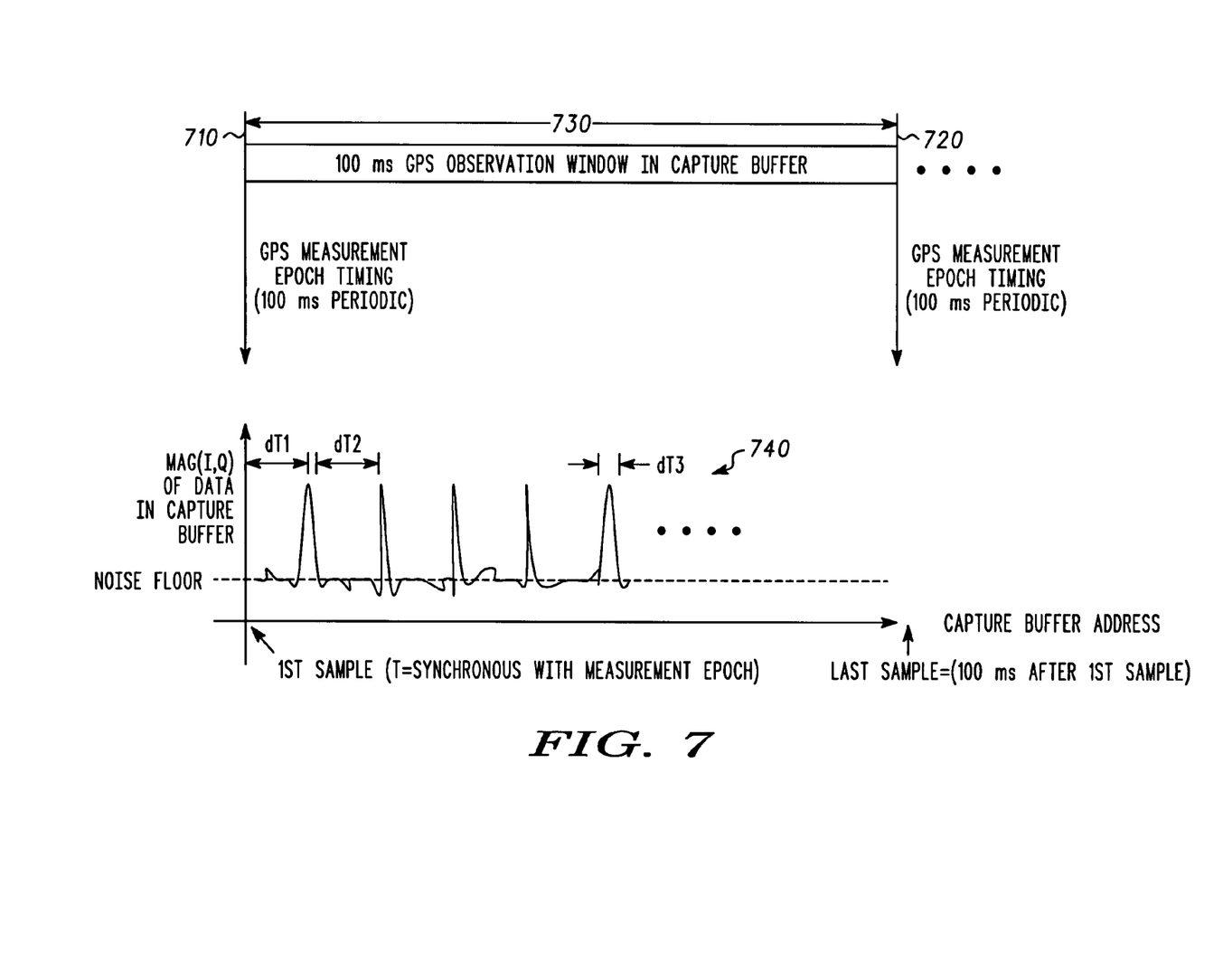
FIG. 7 illustrates a plot of the magnitude of capture data relative to an observation window.

In FIG. 7, the magnitude of all signal samples is computed. Then the magnitude samples are examined for periodic rises in the magnitude that is synchronous with the a-priori known TDMA pulse pattern, which is illustrated in FIG. 6. In FIG. 7, signal characteristics dT1, dT2, dT3 are measured and compared to the known pulse pattern. For the exemplary GSM application, about 21 pulses are present in a 100 ms sample. Since the sample period is 1 ms, there will be some samples that completely contain a TDMA energy burst. Other pulses will overlap two 1-ms sample periods, distributing their energy according to the overlap.

In one embodiment, all TDMA pulses are evaluated for magnitude and degree of overlap, to measure a dT1 time delay given the known dT2 and dT3 of GSM. A precise measure of dT1 is computed with an accuracy and resolution below the 1 ms sample time. A future 100 ms GPS measurement epoch is selected, for example, the K+2 epoch in FIG. 8. The time delay of the rising edge of the 1$^{st}$ TDMA burst after the K+2 100 ms GPS measurement epoch is called dT4 and can now be computed based on the measured dT1 during the Kth interval, the known pulse repetition rate dT2, and the known time interval between the Kth and the K+2$^{nd}$ measurement epoch intervals (200 ms in this example). Specifically, with 100 ms measurement epoch intervals and 200 ms separating the capture event (801 in FIG. 8) and the prediction event (805). The relationship dT1+N*dT2>=200 ms provides a method to compute the integer number of dT2 pulses contained in the Kth and K+1$^{st}$ 100 ms periods. N is then computed by N=integer((200 ms−dT1)/dT2). The quantity dT4 can be computed as dT4=dT1+N*dT2−200 ms, which represents the time delay from the start of the K+2th measurement epoch to the arrival of the 1$^{st}$ TDMA pulse after the K+2th measurement epoch. A pulse width modulator can be used as the blanking pattern generator and be pre-set to start on the K+2 future one hundred ms GPS measurement epoch. The pulse width modulator has an initial time delay dT4, which corresponds to the time delay of the 1$^{st}$ TDMA pulse to be generated by the transmitter after the K+2 measurement epoch predicted, and then starts into a pulse pattern that has duration dT3 and repetition rate dT2. This effectively pre-positions a blanking signal that brackets the expected future TDMA bursts, and the pulse pattern continues to run and remain synchronous with the TDMA bursts for many seconds.

The noise floor of the signal is generally affected with every TDMA transmitter pulse entering the receiver, thus the individual spikes in noise floor correspond with the TDMA energy, and the relative timing of the spikes can be measured. FIG. 7 illustrates two adjacent 100 ms internal GPS timing signals 710 and 720, which bracket a 100 ms signal observation period 730. In FIG. 4, the magnitude of the output of the coherent integrator 438 is observed at 1 ms steps for the 100 ms period, corresponding to period 730 in FIG. 7. The integrator 438 creates one hundred measurements of in-phase and quadrature signals for which one hundred magnitude signals can be created and stored in buffer 440 relative to the start and stop signals, for example, start signal 710 and stop signal 720 in FIG. 7. In FIG. 4, the pulse repetition detector 432 observes the 100 ms duration capture buffer output and measures the PRI of the TDMA jamming signal by measuring period dT2 and a time delay dT1 representing the time delay from the start of the record to the first pulse in the record. The period dT2 and a time delay dT1 are illustrated in FIG. 7.

There are multiple pulses in the one 100 ms record for which the pulse-to-pulse time delays can all be averaged to accumulate measurements of PRI for the TDMA transmitter. If the PRI of the detected signal corresponds to the PRI of the co-located TDMA transmitter as well as the pulse width dT3, then it is likely that the pulse pattern detected is from the TDMA transmitter and will continue into the future for a period of time. Thus, it is possible using measurements dT1 and dT2, as well as the known PRI of the transmitter, to program a blanking pulse generator, for example, generator 434 in FIG. 4, to generate blanking pulses into the future that will substantially bracket the TDMA energy pulses entering the receiver and eliminate the jamming pulses from the preferred signal processing path.

Figure 9:
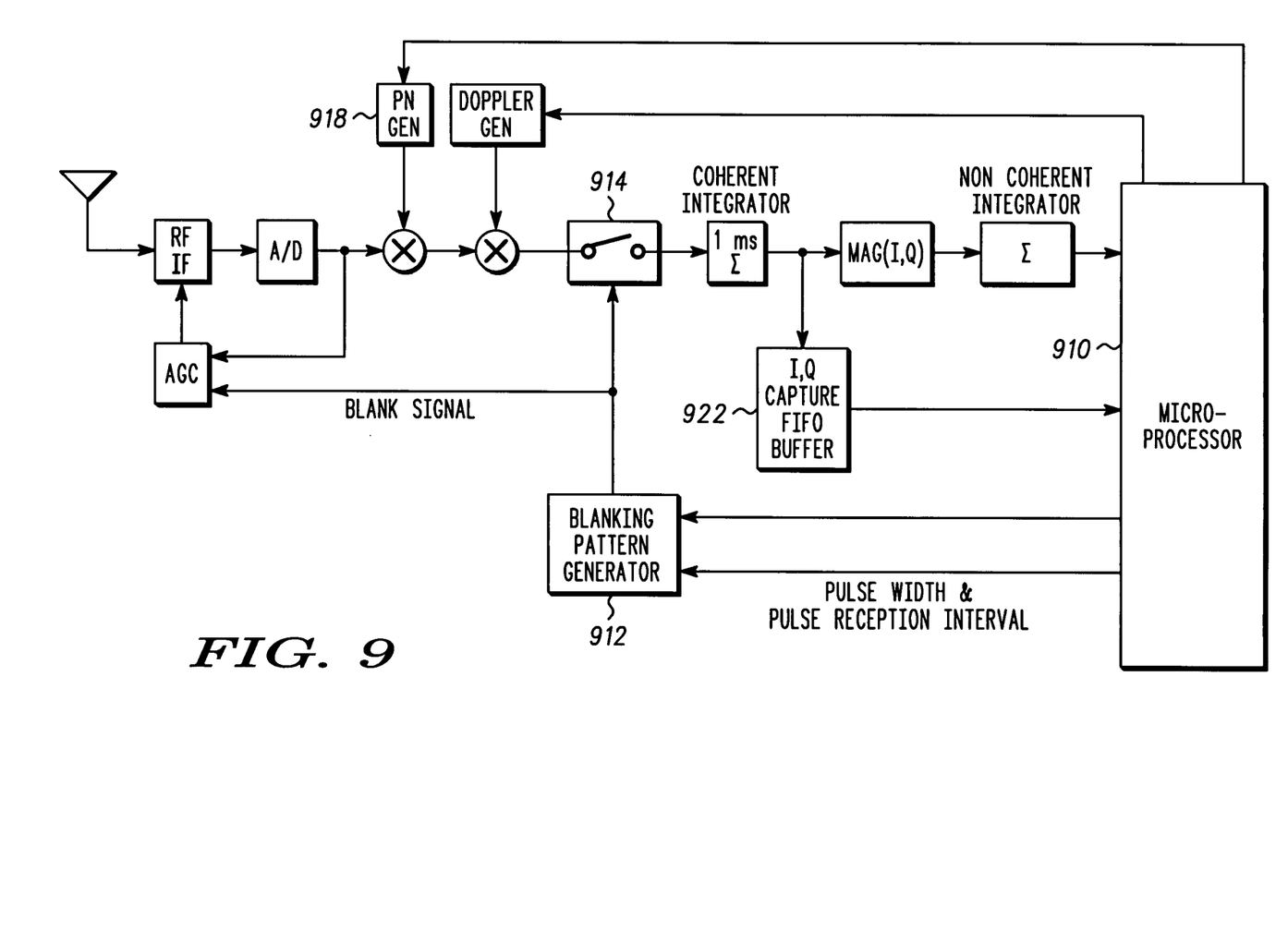
FIG. 9 is a schematic block diagram of an alternative GPS receiver.

In the alternative embodiment of FIG. 9, the upper and lower signal paths of FIG. 2 are combined into a single path, which provides a dual-mode capability of TDMA signal detection and pulse elimination modes. This architecture is based on a faster-than-real-time processor that time-shares multiple satellites on the same hardware block. In FIG. 9, at least one GPS signal processing channel is used in conjunction with a controlling microprocessor 910 and a blanking pulse generator 912. As before, the output of the blanking pulse generator 912 controls a switch 914 and an AGC 916 between active and inactive states. For the case of multiple signal processing channels, each signal processing channel can be used as a jamming signal detector by turning off the corresponding PN Generator 918 while switch 914 is closed. In this mode, the output of the coherent integrator 920 sums are stored into an I, Q Capture FIFO buffer 922. As discussed before, the 1$^{st}$ sample in the FIFO buffer corresponds in time to a GPS timing signal, such as the beginning of a 100 ms event that is synchronized to the GPS signal processing timing. Each subsequent entry in the capture buffer corresponds in time to the entry number times one (1) ms plus the time of the 1$^{st}$ entry. When the FIFO buffer is full, which can be communicated to the microprocessor 910 by a certain one hundred (100) ms interrupt event, the microprocessor 910 extracts the contents of the FIFO buffer and examines it for detection of one or more possible periodic TDMA transmitter pulses, as discussed above. In this case, a software algorithm does the magnitude detection of each of the I, Q pairs, computes a noise floor, and measures substantial increases in the noise floor that correspond to the transmitter PDI/PWD characteristics. The capture events stored in the FIFO buffer are stored relative to the GPS signal processing timing, the microprocessor, which also acts as the GPS receiver controller, computes time delays dT1, dT2, and dT3 shown in FIG. 7, computes the controls for the blanking pattern generator 912 to position the blanking signal in time to correspond to future TDMA energy, thus eliminating it from the GPS signal processing data path for future processing.

Figure 8:
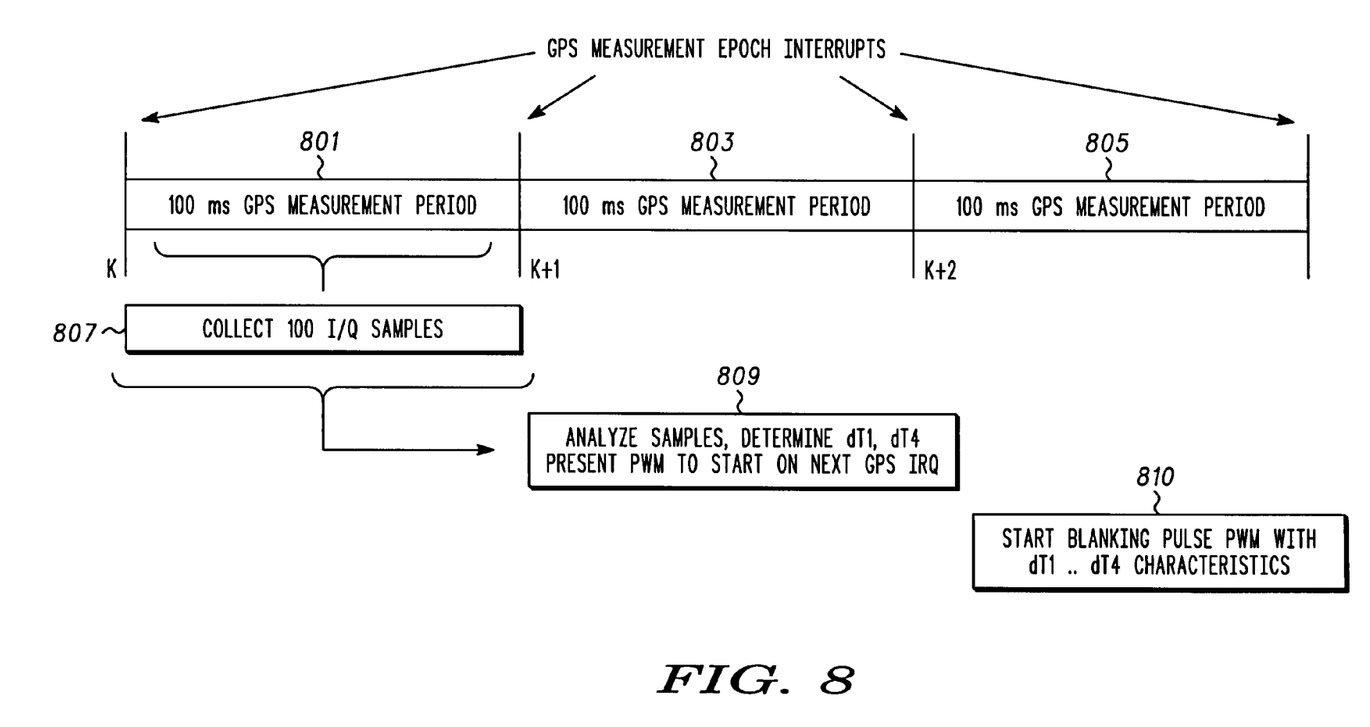
FIG. 8 illustrates sequential data capture windows and processing associated with data capture.

FIG. 8 illustrates how three successive 100 ms GPS timing intervals 801, 803, 805 are used in an interrupted real-time microprocessor to collect data 100 I & Q samples in a buffer, for example the FIFO buffer 922 in FIG. 9. Once collected during interval 801, the microprocessor is interrupted on the start of interval 803 to process the contents of the capture buffer. The microprocessor determines dT1, dT2, dT3 time intervals during the next period 809, computes dT4 and pre-sets the blanking pulse generator with controls that allow it to synchronously start up with the proper time-alignment at the start of interval 805. At the start of interval 805, the blanking pulse generator starts at block 810 and continues to create blanking pulses at the proper PDI/PWD rate to eliminate the TDMA signal continuously during interval 805 and all intervals into the future as well until the microprocessor changes the controls or acquires sufficient GPS measurements for a position computation. After the position computation is complete, the entire GPS receiver is turned off. Although the data collection period 801 and data analysis period 803 are 100 ms in duration for the exemplary embodiment, both shorter and longer periods can be employed as long as the data collection period contains at least one transmitter pulse. For GSM applications, the period must be at least 4.615 seconds to guarantee that at least one transmitter pulse will be contained in the captured record.

In cellular communications applications, the cellular processor can support the detection of jamming signals. For example, the cellular processor could send a serial port message to the GPS function to inform the GPS receiver that the transmitter is on or off. Clearly, if the transmitter is off, there is no reason for GPS to search for and eliminate the periodic jamming signal from the GPS processing path because it is not present. Thus, a simple serial port message could be sent from the cellular telephone controller processor to indicate transmitter-on and transmitter-off conditions, wherein the GPS takes appropriate anti-jam measures only if the transmitter is on.

Another method for the cellular telephone controller processor to aid the detection process is to cover the process of handing over from one slot cycle to another. As discussed, a GSM cell phone can place a transmitter pulse into one (or more) of eight dedicated time slots, or slot cycles. The time slots are numbered 1 through 8. Once a handset is assigned to a particular slot cycle, it remains in that slot cycle most of the time. Thus the method of measuring the timing of the transmitter during a first interval and then setting a blanking pulse to remove the jamming signal in a second later interval works well as long as the transmitter signal remains in the same slot cycle. There are events in the cellular telephone and network that cause a particular handset to be re-assigned from one slot cycle to another, for example, when roaming from one cellular network tower region to another. Such events occur often when the handset is in use in a moving vehicle. The network informs the cell phone to switch to another tower, and typically a slot cycle reassignment occurs at the same time.

The re-assignment of slot-cycles in cellular communications devices may be addressed by periodically re-measuring the timing of the TDMA jammer, or by having the cellular processor inform the GPS receiver every time a slot cycle reassignment event occurs. Relative timing information for the slot cycle reassignment would be helpful for re-synchronizing the blanking signal. For example, if the slot cycle index changes from slot cycle 2 to slot cycle 5, then some type of message from the cellular telephone controller processor to the GPS processor indicating the change and relative timing would allow the GPS processor to re-assign the blanking pulse generator to accommodate the slot cycle change without having to re-measure the jamming signal timing. A message such as "move timing 3 slot cycles in the positive direction" would greatly aid the performance of such a system.

Most of the time in a voice call, a GSM communications device operates in only one of eight slot cycles, thus only 12.5% of the total reception time is "covered" by the transmitter signal. A GSM handset can also operate in multi-slot cycle mode such as in a data call, in which more than one slot cycle is used by the handset to transmit and receive data from the network towers. In such a case, the blanking signal generator would need to be able to generate more than one periodic blanking pulse. One way to address these issues is for the cellular telephone controller processor to send a one-byte message to the GPS control processor. Each bit of the one byte indicates if the transmitter is active in a particular slot cycle, each bit corresponding to the slot cycle number. If all bits are zero, then this indicates that the transmitter is off because none of the eight slot cycles are presently used to actively transmit. If one of the eight bits becomes active, the GPS receiver would then take action to find and eliminate the jamming signal from the GPS path, once the signal is found, the timing associated with the controls of the blanking pulse generator are associated with the slot cycle index of the active slot cycle bit. If the slot cycle bit then changes in the future, the GPS only needs to move the relative timing of the blanking pulse generator to correspond to the timing change indicated by the new active slot cycle bit. This method also covers the case where multi-slot cycles are active because at all times the GPS will know how many slot cycles to blank and the relative timing of one to the other. Thus, the simple one byte message described earlier also covers the case of more than one slot cycle active by simply having all bits associated with active slot cycles in the "1" state. The cellular telephone controller processor sends the active slot cycle byte to the GPS receiver every time there is a change in state, for example, for transmit-off the controller sends "00000000", for transmit-on in slot cycle 1 the controller sends "10000000". When the transmit slot cycle changes from slot 1 to slot 5 the controller sends "00001000". When multi-slot cycles are active, for example, slots 1 and 5, the controller sends "10001000". For transmit-off, the controller sends "00000000".

Figure 10:
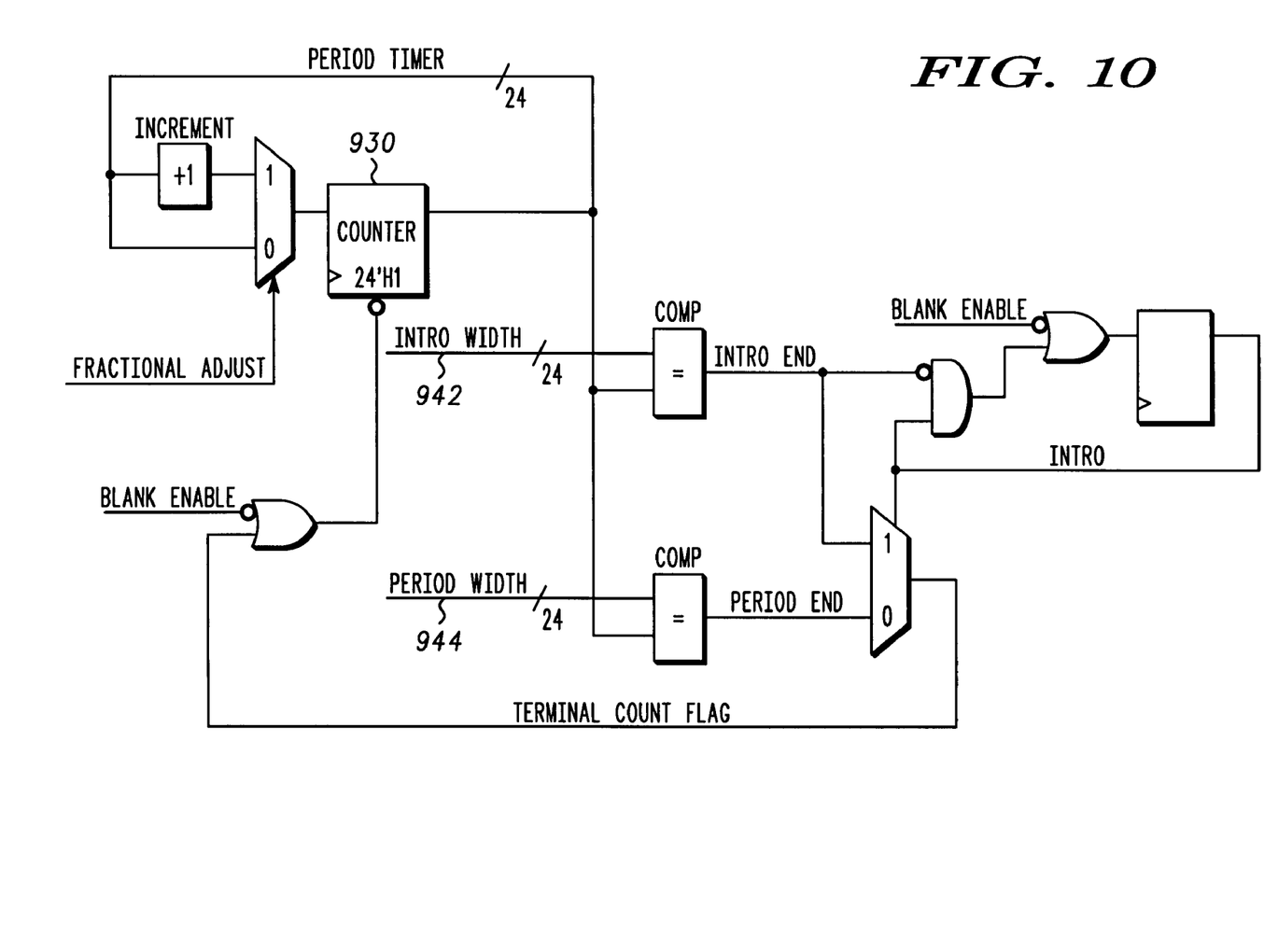
FIG. 10 is a partial schematic block diagram of an exemplary blanking signal generator.
Figure 11:
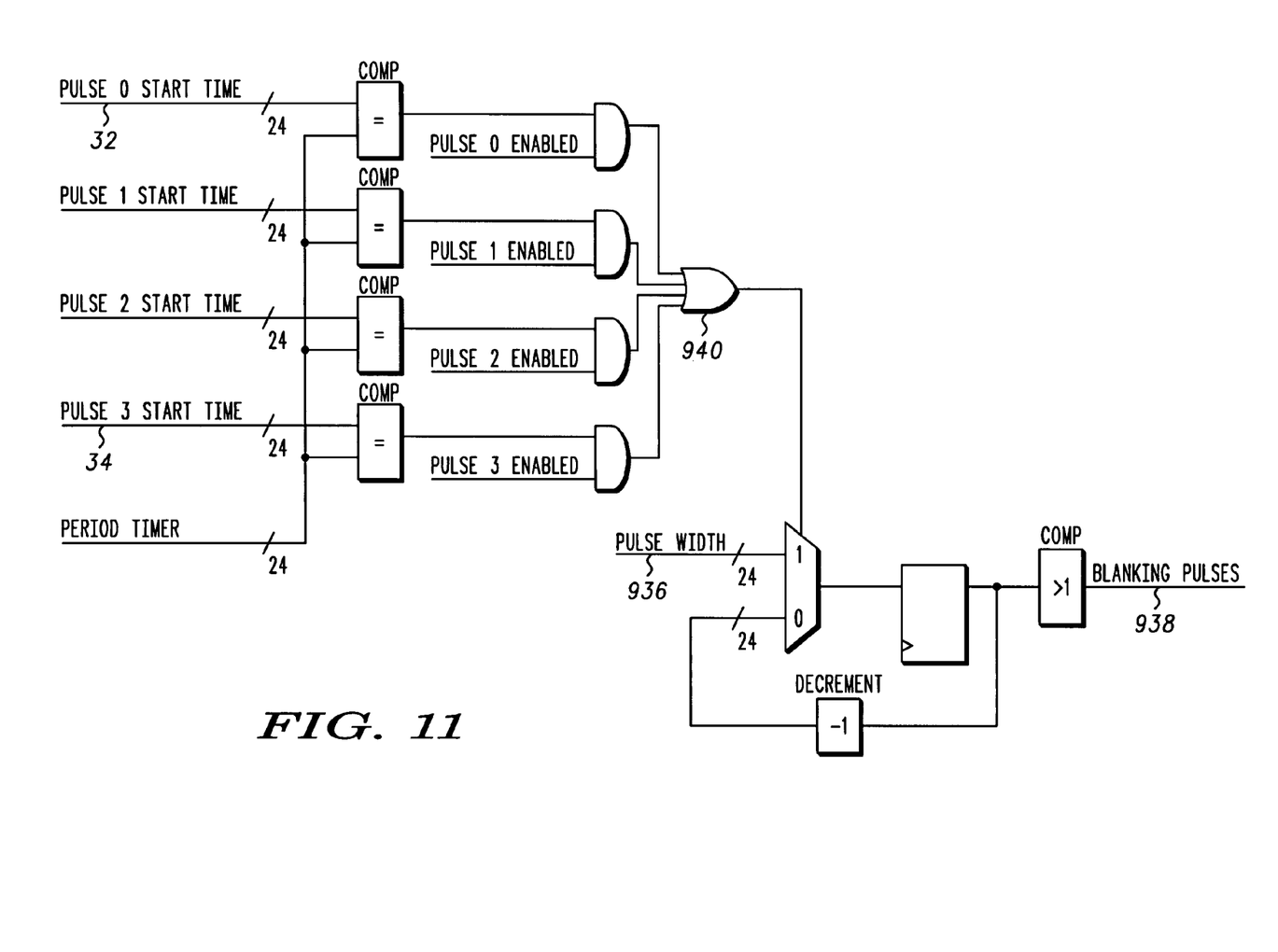
FIG. 11 is another partial schematic block diagram of an exemplary blanking signal generator.
Figure 12:
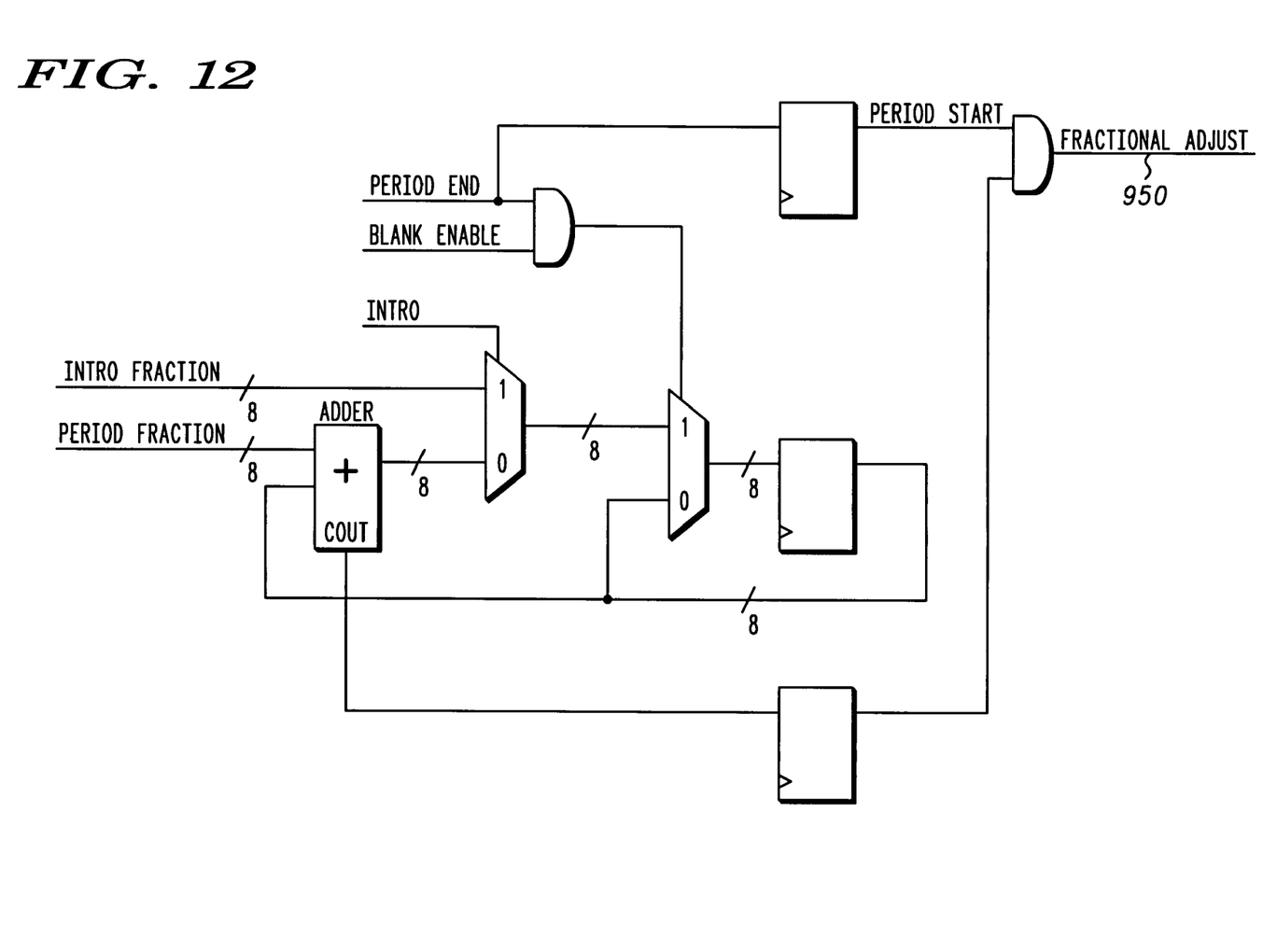
FIG. 12 is another partial schematic block diagram of an exemplary blanking signal generator.

FIGS. 10-12 illustrate an exemplary blanking pattern generator. The period of the blanking circuit's output waveform may reach up to $2^{24}$ periods of the controlling clock, as established by 24-bit counter 930 in FIG. 10. If the controlling clock's period is 62.5 ns, this equates to an output waveform that repeats approximately every second. In FIG. 11, up to four pulses may be defined in the period by setting the 24 bit control words pulse 0 start time 32 through pulse 3 start time 34. The pulses share a 24-bit programmable pulse width register 936 that defines the pulse duration. The output signal "blanking pulses" 938 is the signal that is sent to the switch and AGC, discussed above and illustrated in FIGS. 4 and 9, to prevent the TDMA signal from entering the GPS correlator and to prevent the AGC from adjusting based on the jammer signal.

In FIG. 11, the blanking pulse generator controls four pulses, each of which can be individually enabled or disabled by software by setting control words "pulse 0 start time" 32 through "pulse 3 start time" 34. Each pulse has a programmable 24-bit start time, so each pulse may start anywhere in the waveform period. All pulses pass through OR circuit 940, and thus the pulses may be defined to overlap, or even to start at the end of the period so that the pulses extend into the next period. Any pulse may be enabled or disabled at any time by appropriate control of a corresponding "pulse enable" signal. A pulse may be moved within the waveform period by disabling it, reprogramming its start time, and then enabling it again.

In FIG. 10, the period timer 930 creates the waveform period that the blanking pulse generator references. The period timer is programmed with an "intro width" 942 and a "period width" 944. The introduction width specifies an amount of time to wait after the circuit is enabled before beginning the first period. Both the "intro width" and the "period width" registers are 24-bits wide in the exemplary embodiment. The timer 930 starts at 1 and counts until the appropriate width is reached. When such a terminal count is reached (for either the introduction width or the period width), the period timer resets to 1, and begins counting off the period width again.

In FIG. 12, a fractional error accumulator sends occasional pulses on signal "fractional adjust" 950 to the period timer to force the period timer to adjust for accumulated time error. Both the "intro width" and the "period width" have 8-bit fraction registers that software may define. These registers represent $256^{ths}$ of the controlling clock. At the end of the introduction width, the error accumulator is loaded with the fractional part of the introduction width. Then, at the end of each period, the fractional part of the period width is added to the error accumulation. When the eight bit accumulation results in a carry-out, the period timer is notified so that it can stretch the next period by a whole clock cycle. Other embodiments may include other blanking signal generator architectures.

While the present disclosure and what are presently considered to be the best modes of the inventions have been described in a manner that establishes possession thereof by the inventors and that enables those of ordinary skill in the art to make and use the same, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A method in a device including a satellite positioning system receiver and a transmitter that produces a jamming signal, the method comprising:
    detecting the presence of a jamming signal in the satellite positioning system receiver;
    identifying a characteristic, including a pulse width, of the jamming signal;
    synchronizing a blanking signal with the jamming signal based upon the characteristic of the jamming signal;
    reducing the jamming signal by blanking the satellite positioning system receiver with the blanking signal.

2. The method of claim 1, detecting the presence of the jamming signal based upon a response of the satellite positioning system receiver to the jamming signal.

3. The method of claim 1, detecting the presence of a jamming signal based upon a correlator output signal of the satellite positioning system receiver.

4. The method of claim 1, detecting the presence of the jamming signal based upon a periodically monitored coherent correlator output of the satellite positioning system receiver.

5. The method of claim 1,
    identifying the characteristic of the jamming signal includes identifying a pulse rate of the jamming signal,
    synchronizing the blanking signal with the pulse rate and pulse width of the jamming signal.

6. The method of claim 1, creating the blanking signal based upon the characteristic of the jamming signal.

7. The method of claim 1, blanking the satellite positioning system receiver with the blanking signal includes at least one of disregarding a correlator output signal of the satellite positioning system receiver during blanking periods, applying zero input to the correlator of the satellite positioning system receiver during blanking periods, and suspending operation of the correlator of the satellite positioning system receiver during blanking periods.

8. The method of claim 1, maintaining signal gain of the satellite positioning system receiver during blanking periods.

9. The method of claim 1,
    storing a satellite positioning system correlator output signal,
    detecting the presence of a jamming signal in the satellite positioning system receiver by analyzing the stored satellite positioning system correlator output signal.

10. The method of claim 1,
    storing a satellite positioning system correlator output signal,
    identifying a characteristic of the jamming signal by analyzing the stored satellite positioning system correlator output signal.

11. A method in a satellite positioning system receiver enabled wireless communications device, the method comprising:
    detecting the presence of a first jamming signal in the satellite positioning system receiver;
    reducing the first jamming signal by blanking the satellite positioning system receiver with a first blanking signal synchronized with the first jamming signal;
    determining a timing of a second jamming signal relative to the first jamming signal;
    synchronizing a second blanking signal with the second jamming signal based upon the timing of the second jamming signal.

12. A method in a satellite positioning system receiver enabled wireless communications device, the method comprising:
    detecting a first jamming signal having a jamming characteristic;
    generating a blanking signal having a blanking characteristic;
    synchronizing the blanking signal with the jamming signal so that the blanking characteristic of the blanking signal at least partially overlaps the jamming characteristic of the jamming signal;
    reducing the jamming signal by blanking the satellite positioning system receiver with the synchronized blanking signal;
    compensating for a sensitivity loss in the receiver due to blanking by increasing an integration time associated with processing received satellite signals.

13. The method of claim 12, generating a blanking signal having substantially the same pulse width and pulse rate characteristic as the jamming signal.

* * * * *